United States Patent [19]

Laliberte et al.

[11] 3,956,540

[45] May 11, 1976

[54] METHOD OF COATING ARTICLES

[75] Inventors: Albert J. Laliberte, South Woodstock, Conn.; Armand DeAngelis, Southbridge, Mass.

[73] Assignee: Omnitech Inc., Southbridge, Mass.

[22] Filed: Sept. 10, 1973

[21] Appl. No.: 395,779

[52] U.S. Cl. .................. 427/430; 118/421; 118/425; 118/429; 427/299

[51] Int. Cl.$^{2}$ .................. C03C 17/30; B05C 3/00

[58] Field of Search .................. 117/102 R, 113, 114, 117/161.2 A, 161.2 B, 47 R, 102 A; 118/429, 421, 425; 427/430, 299

[56] References Cited

UNITED STATES PATENTS

| | | | |
|---|---|---|---|
| 2,165,364 | 7/1939 | Ferngren | 117/113 |
| 2,520,658 | 8/1950 | Rheemeld | 118/429 M |
| 2,764,124 | 9/1956 | Reed et al. | 118/425 |
| 2,997,018 | 8/1961 | McGraw | 118/429 |
| 3,097,961 | 7/1963 | Duperriez | 117/113 |
| 3,123,579 | 3/1964 | Lefeure | 118/429 |
| 3,200,002 | 8/1965 | Lusher | 117/113 |
| 3,309,438 | 3/1967 | Bergstein | 117/102 A |
| 3,341,353 | 9/1967 | Johnson | 117/113 |
| 3,404,024 | 10/1968 | Lindemann | 118/429 |
| 3,421,477 | 1/1969 | Gilbert et al. | 118/429 |
| 3,476,827 | 11/1969 | Engelhardt | 117/161.2 A |

*Primary Examiner*—Mayer Weinblatt
*Assistant Examiner*—Edith R. Buffalow
*Attorney, Agent, or Firm*—Shenier & O'Connor

[57] ABSTRACT

A method of and apparatus for applying a synthetic resin coating of predetermined thickness to various articles of different sizes and shapes from a relatively rapidly deteriorating solution of the resin in which an intermittently driven conveyor housed in a controlled atmosphere and suspending different article groups of like articles at spaced locations along the conveyor successively moves the articles from a loading station first to a cleaning station at which the articles are subjected to the action of an ultrasonic cleaner, then to a destaticizing station, then to a coating station at which a dip tank is rapidly raised to immerse the articles in the solution and is lowered at a controlled rate to provide a coating of the required thickness in a single operation, and finally through a precuring zone in which the coating dries tack-free to the loading station at which the coated precured articles can be removed. The coating solution is continuously circulated through the dip tank in such a way that the tank is always brim full and through a filter and chiller which maintains the solution below a predetermined temperature.

18 Claims, 7 Drawing Figures

Fig 5
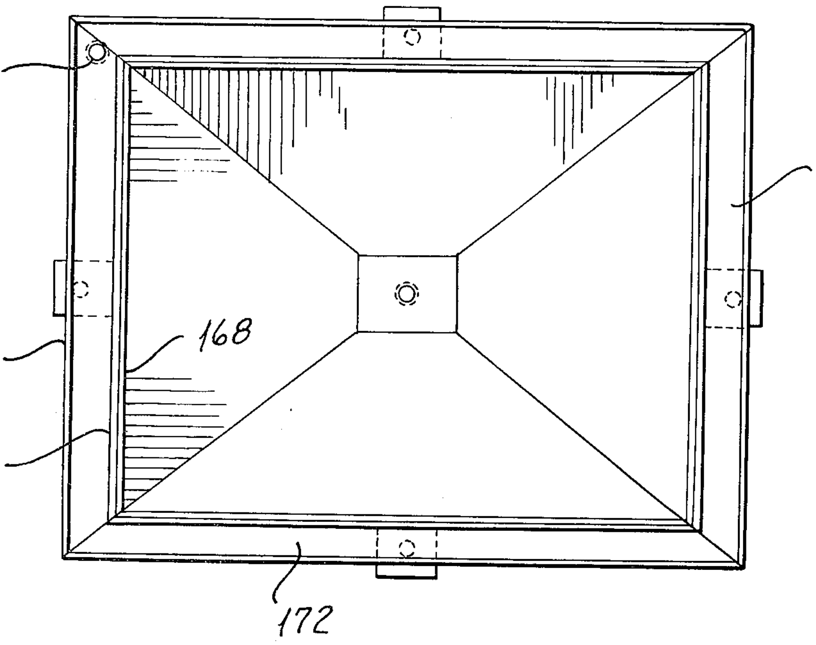
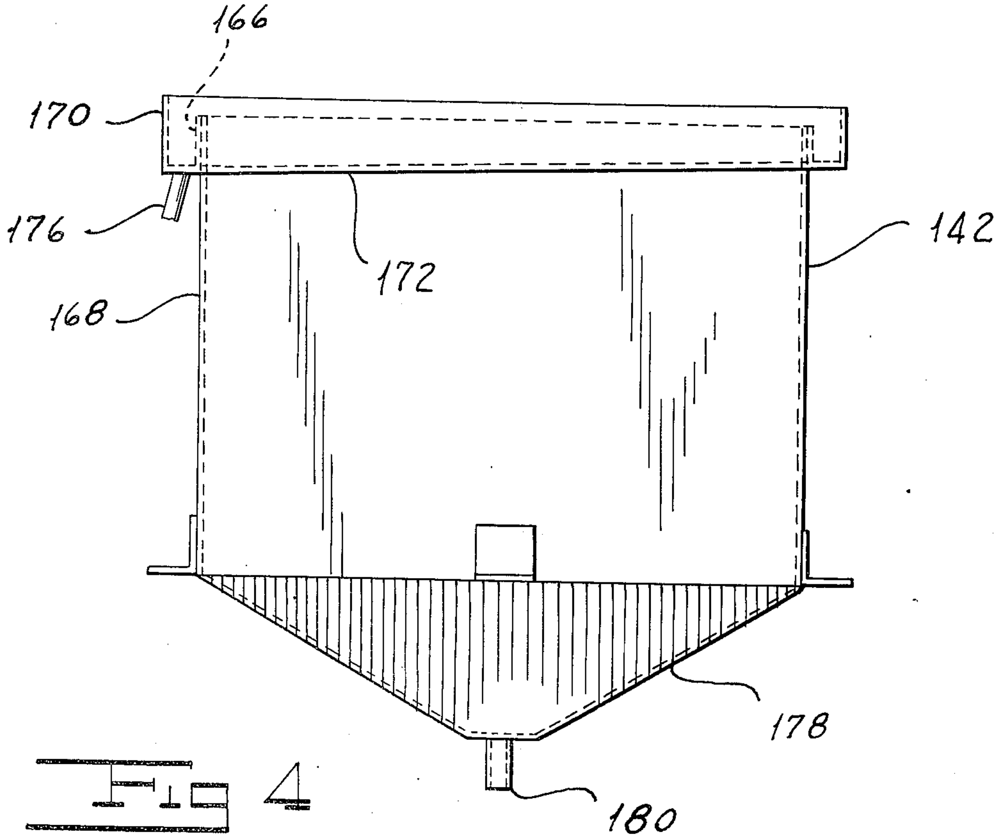
Fig 4

METHOD OF COATING ARTICLES

BACKGROUND OF THE INVENTION

There are known in the prior art various systems for applying coatings of different materials to articles for a variety of reasons. For example, optical articles, such as goggle lenses, visors and the like, have coatings of synthetic resin applied thereto in an effort to increase resistance to abrasion.

One coating composition of the prior art especially adapted for use on synthetic resins to increase the scratch resistance thereof, is a composition formed from polysilicic acid and a copolymer of chlorotrifluorethylene or tetrafluoroethylene and a vinyl ether made and sold by E. I. DuPont de Nemours & Company under the registered trade mark "ABCITE". While this coating solution is generally satisfactory for use on synthetic resins which replace glass in certain applications, difficulty has been experienced in applying the material to optical bodies such as visors and lenses and the like in such a way as will not interfere with the optical properties thereof. In systems of the prior art for applying such coatings, the resultant coating incorporated a number of undesirable physical occlusions and was not optically distortion free. Attempts to build up relatively thick coatings by multiple applications of the solution resulted in haze. In addition to the difficulties pointed out hereinabove, the solution as used in processes of the prior art deteriorated relatively rapidly so that its useful life was only about 10 days.

We have invented a method of and apparatus for coating articles which overcomes the defects of coating systems of the prior art. Our system enables us to apply a clear, optically distortion-free protective coating to an article such for example as a molded synthetic resin lens. The coating resulting from our process has a minimum number of physical occlusions. Our process and apparatus permit us to build up a thick, clear coating in a single application of the coating solution. Our method and apparatus appreciably extend the life of the coating solution.

SUMMARY OF THE INVENTION

One object of our invention is to provide a method of and apparatus for coating articles which overcomes the defects of coating systems of the prior art.

Another object of our invention is to provide a method of and apparatus for applying a clear, optically distortion-free coating to an optical article such as a lens or the like.

A further object of our invention is to provide a method of and apparatus for applying a coating having a minimum number of physical occlusions.

Yet another object of our invention is to provide a method of and apparatus for forming a thick clear coating in a single application step.

Still another object of our invention is to provide a method of and apparatus for coating articles which significantly extends the life of the coating solution.

Other and further objects of our invention will appear from the following description.

In general our invention contemplates the provision of a method of and apparatus for applying a coating of a relatively rapidly deteriorating solution to an optical article such as a molded synthetic resin lens or the like in which a conveyor housed in a controlled atmosphere is intermittently driven to carry a group of articles successively to a cleaning station at which the articles are subjected to the action of an ultrasonic cleaner, to a destaticizing station, to a cleaning station at which a dip tank containing the solution is rapidly raised to immerse the articles and then withdrawn at a controlled rate to provide the articles with a coating of the desired thickness and then through a precuring stage at which the articles dry tack-free and thence back to a loading station. We continuously circulate the solution from a storage reservoir through the dip tank and through a cooler and filter and arrange the tank so as to be continuously overflowing.

BRIEF DESCRIPTION OF THE DRAWINGS

In the accompanying drawings which form part of the instant specification and which are to be read in conjunction therewith and in which like reference numerals are used to indicate like parts in the various views:

FIG. 4 is a front elevation of the dip tank of our apparatus for coating articles.

FIG. 5 is a top plan view of the dip tank illustrated in FIG. 4.

DESCRIPTION OF THE PREFERRED EMBODIMENT

Figure 1:
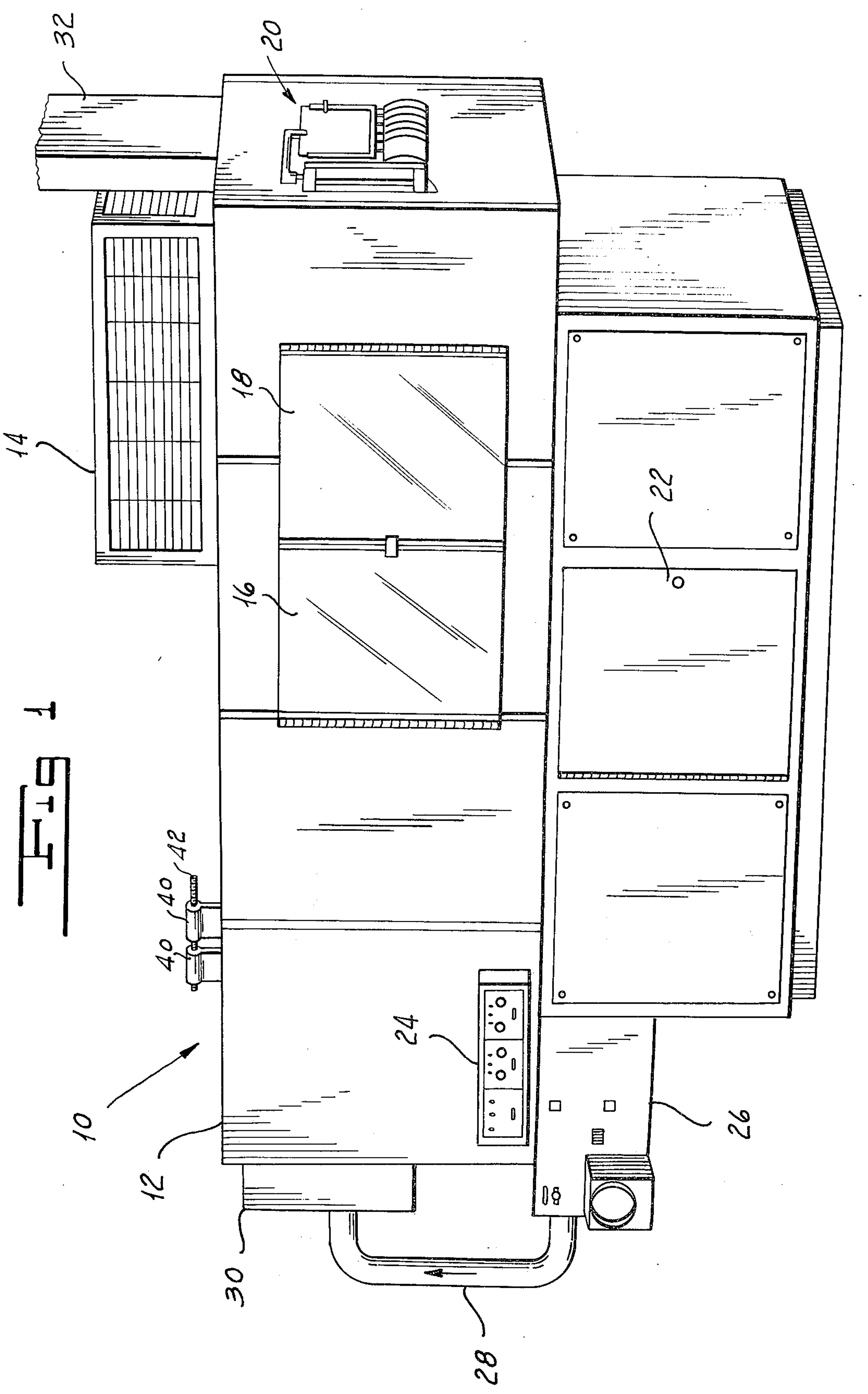
FIG. 1 is a perspective view illustrating the overall apparatus for practicing our method for coating articles.

Referring now to FIG. 1 of the drawings, our system indicated generally by the reference character 10 for coating articles includes a housing 12, for the apparatus to be described hereinbelow. Housing 12 carries a conveyor drive housing 14. The housing 12 is provided with a pair of upper clear plastic access doors 16 and 18 which permit the operation to be observed and which afford access to the interior of the housing as required. A loading station indicated generally by the reference character 20 at one end of the housing 12 permits articles to be loaded onto the conveyor to be described. A lower access door 22 opens into the lower part of the housing 12. A control panel 24 carries the push button and dials and the like associated with my apparatus.

We provide the housing 12 with a controlled atmosphere. For this purpose a dehumidifier 26 forces air through a duct 28 and through a filter 30 into the interior of the housing 12. This air escapes from the housing through a vent 32. Not only does the air fed to the housing 12 escape through the vent 32 but also, when the door at work station 20 is open, air escapes through that door ensuring that dust present in the room will not enter the space within the housing. Filter 30 is a 0.5 micron absolute filter. Preferably, the temperature within the chamber is slightly higher than room temperature, for example, as about 90°F. To accomplish this result, we may incorporate a heater in the dehumidifier 26 and mount a thermostatic device in housing 12 to control the heater. Precuring of the coating for about twenty minutes in this atmosphere results in a tack-free coating. Once the coating is tack-free, it can later be cured for its full cycle of 24 hours at approximately 255°F with no danger of the inclusion of dirt or dust in the coating.

Figure 2:
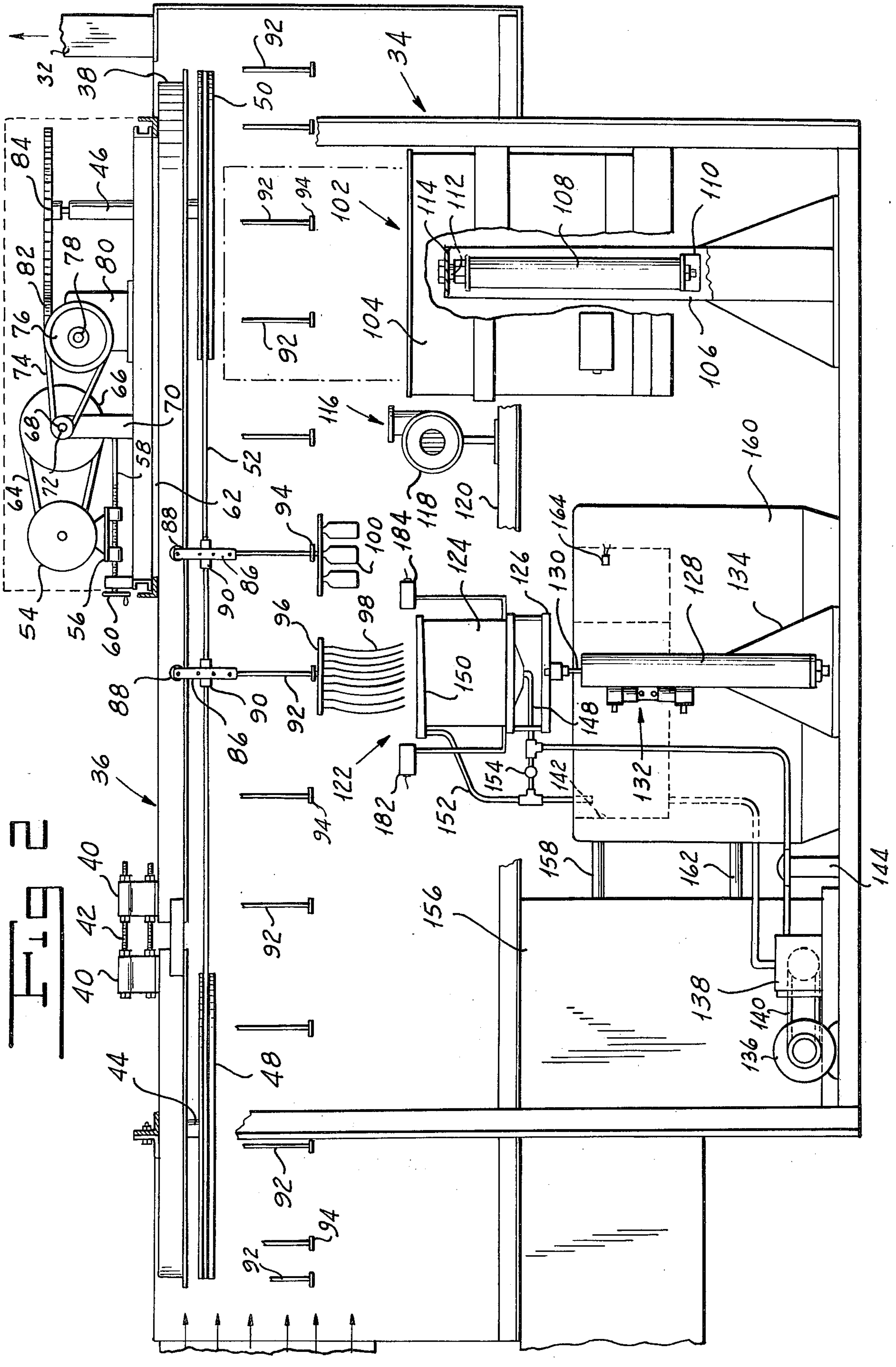
FIG. 2 is a front elevation of the operating parts of our apparatus for coating articles with some parts removed, with other parts broken away and with still other parts shown in section.
Figure 3:
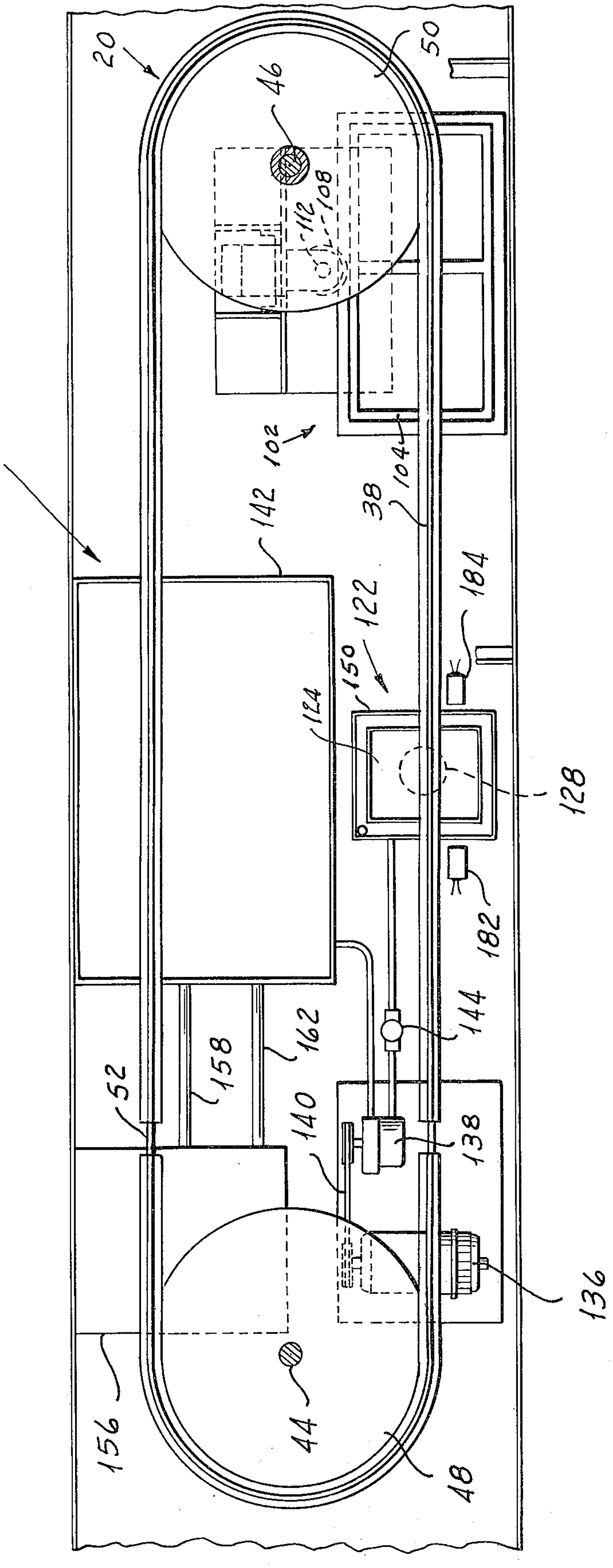
FIG. 3 is a top plan view of the apparatus illustrated in FIG. 2 with some parts removed.

Referring now to FIGS. 2 and 3, a framework 34 within the housing 12 supports a conveyor system, indicated generally by the reference character 36. The Conveyor system includes a plurality of rails 38 having a tee cross sectional shape and forming a continuous path within the housing from the loading station 20 along the front wall of the housing 12 and back along the rear wall of the housing 12 to the station 20. We provide the tee-rails 38 with adjusting blocks 40 which receive bolts 42 to permit some adjustment in the length of the rail system.

Respective shafts 44 and 46 on frame 34 carry pulleys 48 and 50 which receive a driving cable 52. A motor 54 carried by a support 56 may be adjustably positioned on a platform 62 carried by the machine frame 34. For that purpose we thread a worm or screw 58 into the support 56 and provide a handle 60 for turning the screw. Motor 54 drives a belt 64 which engages a pulley 66 supported on a shaft 68 carried by a bracket 70 on the platform 62. Pulley 66 may form part of a speed change mechanism which permits the speed of the conveyor to be changed. An output pulley 72 on the shaft 68 drives a belt 74 which engages a pulley 76 on the input shaft 78 of a gearbox 80. The output shaft of the gearbox 80 carries a pinion 82 which drives a gear 84 mounted on shaft 46. From the structure just described, it will be appreciated that when motor 54 is energized, cable 52 is driven.

The conveyor system 36 includes a plurality of hangers 86 each of which includes a pair of rollers 88 which ride on the horizontal flanges of the rails 38. We provide blocks 90 for attaching the hangers 86 to the cable 52 at spaced locations along the length thereof. Each hanger 86 supports a rod 92 to the lower end of which we secure a magnet 94. Each magnet 94 is adapted to support a workholder 96 on the associated rod 92. Various articles to be coated are supported on the workholders 96. For example, in the particular embodiment illustrated in the drawings, we have shown one of the workholders 96 carrying a plurality of visors 98 to be coated. Another one of the workholders 96 carries plates 100 which may form part of a welding mask assembly, the plates 100 of which are to be coated. While our system is adapted to coat articles made of any material in a particular instance we have successfully coated articles molded from polycarbonate. For purposes of simplicity we have illustrated fully only two hangers 86 and the associated parts in FIG. 2.

As will more fully be explained hereinbelow, we drive the cable 52 intermittently to carry the workholders 96 from the loading station 20 first along the front wall of the housing 12. At a first location in the direction of movement of the workpiece 96. We provide a cleaning station indicated generally by the reference character 102. An ultrasonic cleaner 104 of any suitable type known to the art is supported for vertical sliding movement on a stand 106 at the cleaning station 102. A cylinder 108 carried by a bracket 110 on the stand 106 is adapted to be supplied with air under pressure to move its rod 112 upwardly as viewed in FIG. 2. A bracket 114 secures the piston rod 112 to the ultrasonic cleaner 104 so that when air under pressure is supplied to cylinder 108 the cleaner is raised to the broken line position illustrated in FIG. 2 to subject the articles on a workholder or holders at the cleaning station to the action of the ultrasonic cleaner. The cleaning action of this device effectively cleans the articles in preparation for receiving the coating.

After a workholder leaves the cleaning station 102 and as the cable 52 is driven, the workholder next moves to a destaticizing station indicated generally by the reference character 116. A blower 118 carried by a frame member 120 at the station 116 is adapted to blow a continuous stream of air upwardly and past the articles located at the station effectively to remove any static electrical charge therefrom.

After the articles have been destaticized, they are moved to the coating station indicated generally by the reference character 122. A dip tank 124 located at station 122 is carried by a support 126 secured to the rod 130 of a piston and cylinder assembly including a cylinder 128. We mount the cylinder 128 on a stand 134 at the cleaning station 122. A valve system indicated generally by the reference character 132 to be described more fully hereinbelow is adapted rapidly to supply air under pressure to cylinder 128 rapidly to raise the tank 124 to a level at which articles, such as the articles 98, positioned thereabove, are immersed in the coating solution contained in the tank 124. After the tank has thus been rapidly raised to immerse the articles, it is then lowered at a controlled rate, the speed of which is such that the articles receive a coating of the desired thickness. In one particular use of our apparatus, the rate of withdrawal of the dipping tank is 4 inches per minute. Further, as will be explained hereinbelow, once the tank has been lowered to a level at which the articles, such as articles 98, are out of the tank we rapidly lower tank 124 to its initial position.

As has been explained hereinabove, many coating solutions, such as the particular "ABCITE" solution described hereinabove, deteriorate relatively rapidly. Moreover, none of the systems of the prior art successfully apply such coatings to optical articles as will not interfere with the desirable optical qualities of the coated article. In our system, we continuously supply the coating solution to the tank 124 so that the tank is always overflowing. A motor 136 drives a pump 138 by means of a belt 140 to pump coating solution from a reservoir 142 through a filter 144 to the tank input line 148. An overflow trough 150 on tank 124 to be described more fully hereinbelow, carries overflow from the tank to a return line 152 leading to the reservoir 142. A by-pass valve 154 in adapted to be operated to connect line 148 directly to line 152 when it is desired to drain tank 124.

As has been explained hereinabove, we maintain the atmosphere within the housing 12 at a temperature of about 90°F. While this temperature is necessary effectively to precure the coating, we have discovered that the coating solution must be maintained at a relatively lower temperature to avoid deterioration thereof. A chiller 156 of any suitable type known to the art delivers refrigerant to an input line 158 leading to coils of the like (not shown) within a refrigerating block 160 at the base of the reservoir 142. Refrigerant from the coils in block 160 returns to the chiller 156 through a line 162. A temperature sensing device 164 located within the reservoir 142 controls the operation of the chiller 156 in any suitable manner known to the art to maintain the coating solution at the desired temperature. We have discovered that a temperature of between about 40°F and 50°F provides excellent results.

As has been explained hereinabove, the tank 142 is continuously supplied with coating solution so that it is always overflowing. Referring now to FIGS. 4 and 5, the solution thus supplied to the tank 142 continuously overflows the upper edge of the wall 168 of the tank 142. The return trough 150 includes an inner wall 166 which extends upwardly to the upper edge of the tank wall 158 so that the overflowing solution also flows over the upper edge of wall 66 and into the trough 150. The outer wall 170 of the trough preferably extends above the upper edge of the inner wall to avoid any spilling of the solution out of the trough. We so arrange the base 172 of the trough as to provide a low point at one corner 174 of the trough. A fitting 176 at this corner provides a connection for the return line 152. We also form the tank with a base 178 having downwardly sloping walls leading towards the center of the tank bottom. At this location, we provide a fitting 180 for receiving the input line 148.

A source of illumination such as a lamp 182 mounted above the upper edge of trough 150 and at one side thereof is adapted to direct light toward a photoresponsive device 184 at the other side of the tank. This light path will be interrupted so long as the tank is raised to a level at which articles are partially immersed therein. After leaving the coating zone 122, the articles are carried around the left end of the inside of the housing 12 and backwardly along the rear wall thereof for a period of time sufficient to effect the precuring of the coating. We have discovered that a time of about 20 minutes within the controlled atmosphere inside housing 12 is sufficient to effect a tack-free drying of the coating.

Figure 6:
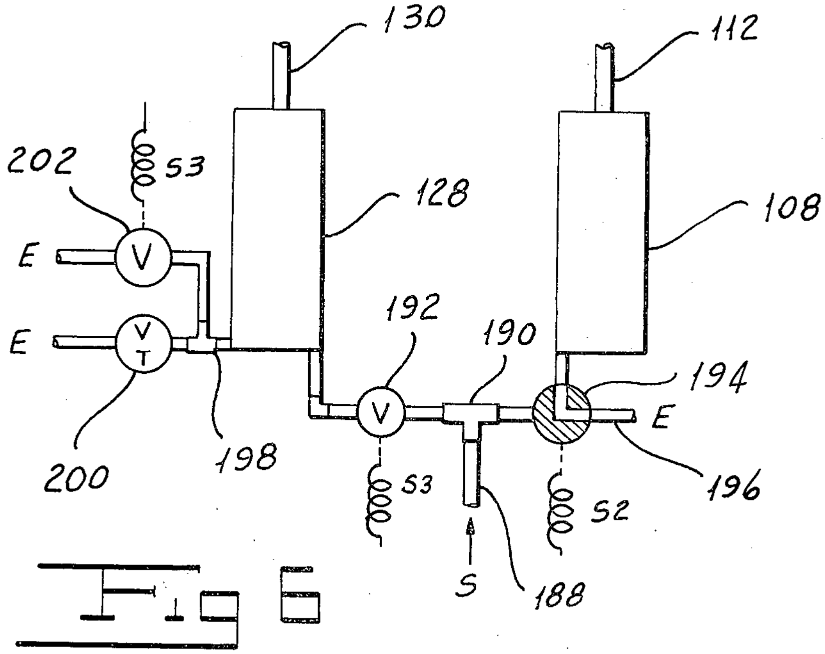
FIG. 6 is a schematic view illustrating the pneumatic system of our apparatus for coating articles.

Referring now to FIG. 6, we have illustrated one form of pneumatic system which may be used to control the operation of the cylinders 108 and 128. A line 188 connected to a suitable source of air under pressure is connected by a tee to the inlets to a pair of valves 192 and 194. Valve 194 is a two-way valve adapted to be operated by a solenoid S2. In the normal position of the valve 194, it connects the interior of cylinder 108 to an exhaust line 196. When solenoid S2 is energized, valve 194 is operated to connect the tee 190 to the interior of cylinder 108 to supply fluid under pressure thereto. In response to this pressure the rod 112 raises the ultrasonic cleaner 104.

Valve 192 is a normally closed valve which is adapted to be opened upon operation of the solenoid S1 to connect supply pressure to the interior of cylinder 128. As will more fully be explained hereinbelow, when pressure is applied to the interior of the cylinder rod 130 raises the tank 124 relatively rapidly. When the tank reaches the upper limit of its travel any suitable means such as a limit switch to be described interrupts the circuit of solenoid S1 to permit valve 192 to close. A tee 198 connects the interior of the cylinder 128 to a throttling valve 200 and a normally closed valve 202 adapted to be opened in response to energization of solenoid S3. Once the piston rod 130 has reached the upper limit of its travel and valve 192 closes, the throttling valve 200 permits the outflow of air from the cylinder 128 at a controlled rate so as to provide the desired rate of withdrawal of the tank 124. When the tank 124 reaches the position at which light from the lamp 182 no longer is blocked by the parts being coated the photoresponsive device 184 energizes winding S3 to open valve 202 rapidly to exhaust the cylinder 128 to permit the tank 124 to return rapidly to its initial position.

Figure 7:
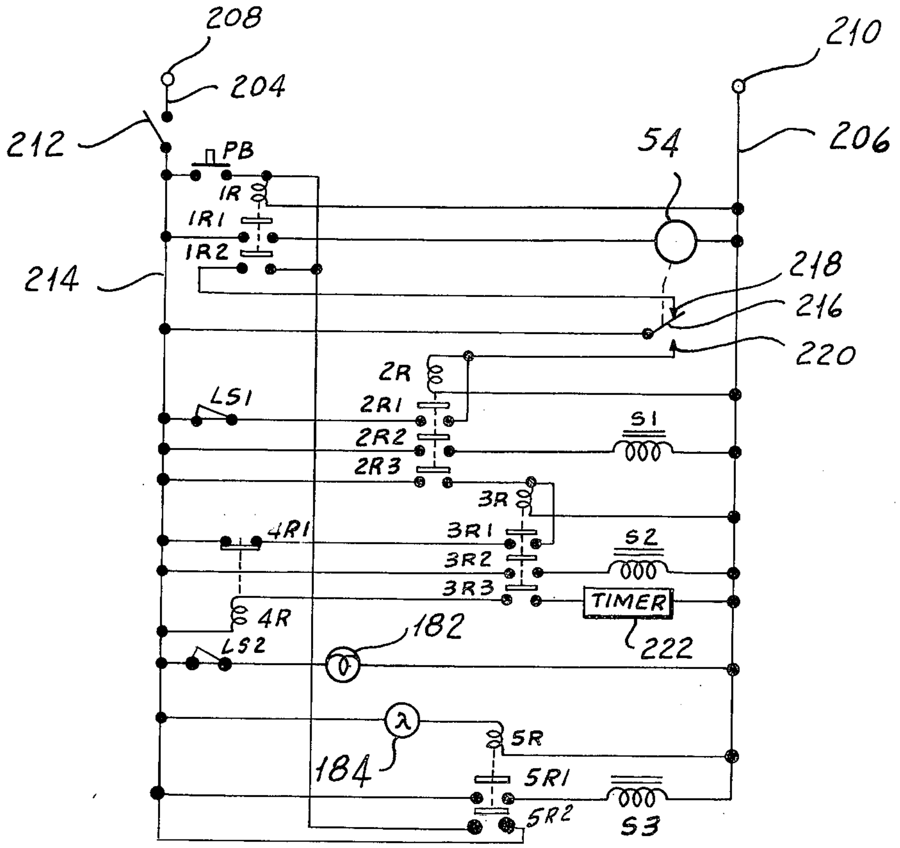
FIG. 7 is a schematic view of one form of electrical control circuit which can be used with our apparatus for coating articles.

Referring now to FIG. 7, we have shown one form of control circuit which may be employed to control the operations of the conveyor and of the solenoids associated with the ultrasonic cleaner and with the coating tank operating mechanism. We connect respective conductors 204 and 206 to the terminals 208 and 210 of a suitable source of potential. On/off switch 212 is adapted to be closed to connect conductor 204 to a conductor 214 to energize this part of the control circuit. With that switch closed, the first step of the conveyor is initiated by closing a push button switch PB to energize a relay winding 1R to close respective normally open switches 1R1 and 1R2. Switch 1R2 completes the holding circuit for winding 1R through a contact 218 and a switch arm 216 adapted to be moved from contact 218 into engagement with a contact 220. Closing of switch 1R1 energizes motor 54. I so arrange the system that when motor 54 completes that part of a revolution or a number of revolutions corresponding to one step of the conveyor, mechanism responsive thereto momentarily moves 216 out of engagement with contact 218 and into engagement with contact 220. As soon as arm 216 leaves contact 218 the holding circuit for winding 1R is broken and motor 54 stops.

Momentary engagement of arm 216 with contact 220 energizes a relay winding 2R to close respective normally open switches 2R1, 2R2 and 2R3. Closing of switch 2R1 completes a holding circuit for winding 2R through a limit switch LS1 which is normally closed and which is adapted to be opened as soon as the coating tank has reached the upper limit of its travel. Switch 2R2 closes to energize solenoid S1 to open valve 192 to cause the coating tank to be raised.

Closing of switch 2R3 energizes a relay winding 3R to close normally open switches 3R1, 3R2 and 3R3. Closing of switch 3R1 completes a holding circuit for winding 3R through a normally closed switch 4R2. Closing of switch 3R2 energizes solenoid S2 to move valve 194 to a position at which air under pressure is supplied to the cylinder 108. Closing of the switch 3R3 energizes a timer 222, which, at the end of a predetermined time, completes the circuit of a winding 4R to open switch 4R1. When that occurs, the holding circuit of 3R is broken and the cleaning unit is lowered. As is also indicated in FIG. 7, when light from source 182 impinges on the photoresponsive device 184 a winding 5R is energized to close switch 5R1 to energize winding S3 to open valve 202 to by-pass valve 200 rapidly to exhaust cylinder 128. A second limit switch LS2 connects lamp 182 to line 214. This switch LS2 is open in the lower position of the tank 140 so that by-pass valve solenoid S3 is deenergized at the beginning of a coating tank raising operation. Energization of winding 5R also closes a switch 5R2 to energize winding 1R to initiate the next step of conveyor motor 54.

In the control circuit illustrated in FIG. 7, we have assumed that the ultrasonic cleaning tank is raised for a time determined by timer 222 which is shorter than the coating cycle of the shortest article to be coated.

In use of our apparatus to practice my process we first turn on the dehumidifier 26, which may, if necessary, incorporate a heater, so as to feed dry air through the filter 30 into the housing 12 and to maintain the temperature within the housing at about 90°F. Next, the chiller 156 is set in operation and the motor 136 is energized. This operation continuously circulates the coating solution through tank 124 and back to the reservoir. At the same time, the temperature of the solution is maintained at a temperature between about 40°F and about 50°F. The rate at which the pump 138 supplies the solution is such that solution continuously is overflowing the tank 124 and flowing back through the overflow trough to the tank. This action, together with the constant filtering provided by filter 144, keeps the solution free of undesirable foreign matter and prevents the build-up of gel particulate of the solution. Moreover, the cooling of the solution minimizes the possibilites of "curtaining" or uneven application of the coating to the parts. Further to ensure that the coating solution is at the proper low temperature we may insulate the tank 124. Our pump system employs a peristaltic pump and polyurethane compression tubing. It serves to keep any gellation of the solution away from the dip area.

Once the auxiliary components of the system have been set into operation in the manner described, the control circuit for the conveyor is energized. Racks of parts can be loaded on the conveyor at the station 20. Push button PB is actuated to initiate the first step of movement of the conveyor. At the end of that step, the ultrasonic cleaner 104 is raised to clean the parts supported on the carriers 86 located at the cleaning station. At the same time, the blower 118 destaticizes components supported at the destaticizing station. Tank 124 is rapidly raised to immerse parts supported on a workholder 96 located at the cleaning station. After the dipping tank 124 has been fully raised, it is lowered at a controlled rate until the parts move out of the path between source 182 and device 184 at which time the by-pass valve 200 is opened rapidly to lower the tank. The significance of this operation will be apparent upon consideration of the coating of articles such as visors which are about 8 inches long with lenses which are less than 2 inches long. The dipping time for the visor requires about 2 minutes in the tank whereas the lens requires less than 30 seconds. We have discovered further that by practice of our process a coating of the desired thickness can be built up in a single dip in the tank 124 at the controlled withdrawal rate. By use of our method and apparatus, we have been able to build up coatings up to ten microns thick and in some instances up to even 15 microns thick. Not only is the coating produced by our method and apparatus relatively thick but also it is substantially uniform over the entire area of the article being coated. This factor is extremely important where the article, such as a lens, has a length of, for example, 2 inches, in the direction of relative movement during the dipping operation. That is, our method and apparatus avoids a graduated thickness in the coating, such as would be intolerable in a lens coating.

At the end of a cycle, the conveyor is again stepped and the operations are repeated. Since the conveyor steps are initiated in response to complete withdrawal of articles from the dipping tank there is no waste time between steps. During the time over which the parts are in the region 186 of the housing 12 they are precured to a tack-free condition, so that upon arrival back at the loading station they can be removed and finally cured in the manner described above.

It will be seen that we have accomplished the objects of our invention. We have provided a method of and apparatus for coating articles which overcomes the defects of coating systems of the prior art. Our method and apparatus are especially adapted to provide clear coatings on optical articles such as molded synthetic resin lenses and the like. Our process and apparatus extends the life of the coating solution from about 10 days to as much as 3 months. It greatly enhances the marresistance of an optical article coated thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of applying a clear distortion-free scratch resistant coating of a synthetic resin to optical articles including the steps of maintaining a solution of said synthetic resin at a coating station, conveying articles to be coated from a location remote from said coating station to said coating station, stopping said articles at said coating station, first moving said articles at said coating station relative to said solution at a first controlled rate from a position out of said solution to a position immersed in said solution, and then moving said articles relative to said solution at a second controlled rate different from said first controlled rate to move said articles from said immersed position to said position out of said solution.

2. A method as in claim 1 in which said first controlled rate is greater than said second controlled rate.

3. A method as in claim 1 in which said maintaining step comprises maintaining a supply of said solution in a dip tank and supplying said solution to said tank at a rate at which said tank continuously overflows.

4. A method as in claim 1 in which said maintaining step comprises maintaining a supply of said solution in a dip tank, supplying said solution to said tank at a rate at which said tank continuously overflows, and continuously cooling said solution.

5. A method as in claim 1 in which said maintaining step comprises maintaining a supply of said solution in a dip tank, supplying said solution to said tank at a rate at which said tank continuously overflows, continuously cooling said solution, and continuously filtering solution fed to said tank.

6. A method as in claim 1 in which said maintaining step comprises maintaining a supply of said solution in a dip tank, supplying said solution to said tank at a rate at which said tank continuously overflows, continuously cooling said solution, continuously filtering solution fed to said tank, collecting the solution overflowing from said dip tank and recycling it to said tank.

7. A process as in claim 1 including the steps of cleaning said article and destaticizing it prior to said first moving step.

8. A process as in claim 1 including the step of subjecting said coated article to the influence of a controlled atmosphere in a precuring zone to dry said coating to tack-free condition.

9. A process for applying a clear distortion-free scratch resistant coating of a synthetic resin to optical articles including the steps of conveying articles to be coated successively to a cleaning station and to a coating station and through a precuring zone in a housing, maintaining in said housing a controlled atmosphere at a first temperature sufficiently above room temperature to precure a coating of said synthetic resin, maintaining a solution of said synthetic in a dip tank at said coating station, continuously supplying said tank with solution at a rate to cause said tank to overflow, cooling the solution in said tank to a second temperature below room temperature, cleaning said articles at said cleaning station, stopping said articles at said coating station, first moving said articles at said coating station at a first controlled rate relative to said tank from a position out of said solution to an immersed position in said solution, then moving said articles relative to said solution at a second controlled rate which is slower than said first controlled rate from said immersed position to said position out of said solution, and maintaining said coated articles in said atmosphere for a period of time sufficient to precure said coating to a tack free condition.

10. A process as in claim 9 including the step of destaticizing said articles between said cleaning and coating steps.

11. A process as in claim 9 in which said first temperature is about 90°F and in which said second temperature is between about 40°F and about 50°F.

12. A process as in claim 9 in which said atmosphere maintaining step comprises passing dehumidified air through said housing.

13. A method of applying a scratch resistant coating of synthetic resin to optical articles including the steps of maintaining a supply of a solution of said synthetic resin in a reservoir at a storage location, applying a coating of said solution from said supply to articles at a coating station, circulating said synthetic resin from said reservoir to said coating station and back to said reservoir, maintaining the ambient atmosphere at said coating station at a first temperature sufficiently above room temperature to precure said coating of solution, and continuously cooling said reservoir to cool the supply of solution at said storage location to a second temperature below room temperature.

14. A method as in claim 13 in which said coating step comprises supplying said solution to a tank at said coating station at a rate at which said tank continuously overflows.

15. A method as in claim 14 in which said maintaining step comprises collecting the solution overflowing from said tank and recycling the collected solution to said tank.

16. A method as in claim 13 in which said first temperature is about 90°F and in which said second temperature is between about 40°F and about 50°F.

17. A method as in claim 16 in which said solution comprises polysilicic acid.

18. A process for applying a clear distortion-free scratch resistant coating comprising polysilicic acid fluoroethylene polymer to optical articles including the steps of maintaining a supply of a solution of said polysilicic acid fluoroethylene polymer in a reservoir at a storage location, applying a coating of said solution to said articles in an ambient atmosphere at a temperature of about 90°F at which said coating will precure, circulating said solution from said reservoir to said coating station and back to said reservoir, and continuously cooling said reservoir to cool said solution in said supply to a temperature between about 40°F and about 50°F.

* * * * *

Disclaimer 3,956,540.—*Albert J. Laliberte,* S. Woodstock, Conn. and *Armand DeAngelis,* Southbridge, Mass. METHOD OF COATING ARTICLES. Patent dated May 11, 1976. Disclaimer filed Feb. 25, 1981, by the assignee, *Omnitech Inc.*

Hereby enters this disclaimer to claims 1 and 2 of said patent.

[*Official Gazette May 19, 1981.* ]

REEXAMINATION CERTIFICATE (69th)

United States Patent [19]

Laliberte et al.

[11] B1 3,956,540

[45] Certificate Issued Apr. 5, 1983

[54] METHOD OF COATING ARTICLES

[75] Inventors: Albert J. Laliberte, South Woodstock, Conn.; Armand DeAngelis, Southbridge, Mass.

[73] Assignee: Omnitech Inc., Southbridge, Mass.

Reexamination Request

No. 90/000,051, Aug. 10, 1981

Reexamination Certificate for:

| | |
|---|---|
| Patent No.: | 3,956,540 |
| Issued: | May 11, 1976 |
| Appl. No.: | 395,779 |
| Filed: | Sep. 10, 1973 |

Disclaimer of claims 1 and 2, filed Feb. 25, 1981 (1006 O.G. 29).

[51] Int. Cl.$^{3}$ .................................................. B05D 5/06

[52] U.S. Cl. ... 427/164, 427/169, 427/299, 427/345, 427/379, 427/430.1, 118/164

[58] Field of Search .............................................. none

[56] References Cited

U.S. PATENT DOCUMENTS

| | | | |
|---|---|---|---|
| 1,681,441 | 8/1928 | Sherman et al. | 118/23 |
| 2,233,069 | 2/1941 | Atwell | 91/55 |
| 2,508,200 | 5/1950 | Tarlton | 91/46 |
| 2,616,549 | 11/1952 | Ornitz | 198/19 |
| 2,661,307 | 12/1953 | Foster | 427/430.1 |
| 2,814,575 | 11/1957 | Lange | 134/1 |
| 3,429,846 | 2/1969 | Bechtold et al. | 260/29.6 |
| 3,458,342 | 7/1969 | Cormia | 427/430 |
| 3,458,348 | 7/1969 | Sherman | 351/166 |
| 3,484,157 | 12/1969 | Crandon et al. | 351/166 |
| 3,566,891 | 3/1971 | Koch | 118/64 |
| 3,582,398 | 6/1971 | Ringler | 427/164 X |
| 3,700,487 | 10/1972 | Crandon | 427/164 X |
| 3,865,619 | 2/1975 | Pennewiss et al. | 427/164 X |
| 3,953,115 | 4/1976 | French et al. | 427/164 |

FOREIGN PATENT DOCUMENTS

| | | |
|---|---|---|
| 794098 | 4/1958 | United Kingdom. |
| 1113961 | 5/1968 | United Kingdom. |

OTHER PUBLICATIONS

Industrie-Lackier-Betrieb, 1954, No. 18, p. 12.

Industrie-Lackier-Betrieb, No. 12, pp. 502–505, 1967.

The Dip Coater, Industrial and Engineering Chemistry, Vol. 15, No. 1, pp. 48–50, Payne.

Industrial Paint Application, Tatton et al. pp. 6–21, 1964, George Newnes Limited, Tower House, Southampton Street, London, W.C. 2.

*Primary Examiner*—Shrive P. Beck

[57] ABSTRACT

A method of and apparatus for applying a synthetic resin coating of predetermined thickness to various articles of different sizes and shapes from a relatively rapidly deteriorating solution of the resin in which an intermittently driven conveyor housed in a controlled atmosphere and suspending different articles groups of like articles at spaced locations along the conveyor successively moves the articles from a loading station first to a cleaning station at which the articles are subjected to the action of an ultrasonic cleaner, then to a destaticizing station, then to a coating station at which a dip tank is rapidly raised to immerse the articles in the solution and is lowered at a controlled rate to provide a coating of the required thickness in a single operation, and finally through a precuring zone in which the coating dries tack-free to the loading station at which the coated precured articles can be removed. The coating solution is continuously circulated through the dip tank in such a way that the tank is always brim full and through a filter and chiller which maintains the solution below a predetermined temperature.

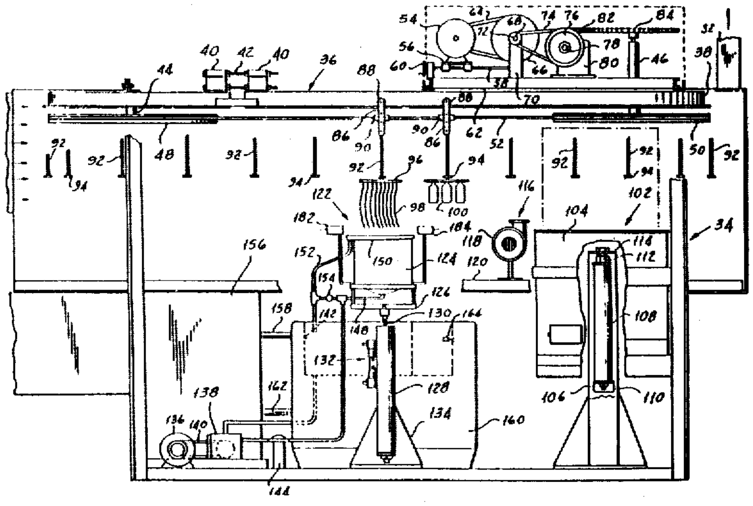

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

NO AMENDMENTS HAVE BEEN MADE TO THE PATENT.

AS A RESULT OF REEXAMINATION, IT HAS BEEN DETERMINED THAT:

Claims 1 and 2 were previously disclaimed.

Claims 3–8 having been finally determined to be unpatentable, are cancelled.

Claims 9, 13 and 18 are determined to be patentable as amended:

9. A process for applying a clear distortion-free [hard] scratch resistant coating of *an organosilicon thermoset cross-linkable polymer* [a synthetic resin] to optical articles including the steps of conveying articles to be coated successively to a cleaning station and to a coating station and through a precuring zone in a housing, maintaining in said housing a controlled atmosphere at a first temperature sufficiently above room temperature to precure a coating of said polymer [resin] *to a tack free condition within a predetermined period of time,* maintaining a solution of said [synthetic] *polymer* in a dip tank at said coating station, continuously supplying said tank with solution at a rate to cause said tank to overflow, cooling the solution in said tank to a second temperature below room temperature, *said cooling step including controlling the temperature of said solution to minify the possibility of the application of uneven coatings of said solution to said articles,* cleaning said articles at said cleaning station, stopping said articles at said coating station, first moving said articles at said coating station at a first controlled rate relative to said tank from a position out of said solution to an immersed position in said solution, then moving said articles relative to said solution at a second controlled rate which is slower than said first controlled rate from said immersed position to said position out of said solution, [and] maintaining said coated articles in said atmosphere *in said housing for said predetermined period of time sufficient to precure said coating to a tack free condition, and then baking said articles carrying said precured coatings at a third temperature elevated with reference to said first temperature* for a period of time sufficient to [precure] *cure* said coating*s* *fully* to *their scratch resistant* [a tack free] condition.

13. A method of applying a scratch resistant coating of *an organosilicon thermoset cross-linkable polymer* [synthetic resin] to optical articles including the steps of maintaining a supply of a solution of said *polymer* [synthetic resin] in a reservoir at a storage location, applying a coating of said solution from said supply to articles at a coating station, circulating said *solution* [synthetic resin] from said reservoir to said coating station and back to said reservoir, maintaining the ambient *temperature adjacent to* [atmosphere at] said coating station at a first temperature sufficiently above room temperature to precure said coating of solution *to a tack free condition in a predetermined period of time, maintaining said coated articles at said first temperature adjacent said coating station for said predetermined time to precure the coatings thereon to said tack free condition,* [and] continuously cooling said reservoir to cool the supply of solution at said storage location to a second temperature below room temperature, *said cooling step including controlling the temperature of said supply of solution to minify the possibility of the application of uneven coatings of said solution to said articles, and baking said articles carrying said precured coatings at a third temperature elevated with reference to said first temperature for a time sufficient to cure said coatings fully to their scratch resistant condition.*

18. A process for applying a clear distortion-free scratch resistant coating comprising polysilicic acid fluoroethylene polymer to optical articles including the steps of maintaining a supply of a solution of said polysilicic acid fluoroethylene polymer in a reservoir at a storage location, applying a coating of said solution to said articles in an ambient atmosphere at a temperature of about 90° F. at which said coating will precure, *retaining said coated articles in said atmosphere at about 90° F., for a period of time sufficient to precure said coatings to a tack free condition,* circulating said solution from said reservoir to said coating station and back to said reservoir, [and] continuously cooling said reservoir to cool said solution in said supply to a temperature between about 40° F. and about 50° *F., said cooling step including controlling the temperature of said supply of solution to minify the possibility of the application of uneven coatings of said solution to said articles, and baking said articles carrying said precured coatings at a temperature of approximately 255° F. for a time sufficient fully to cure said coatings to scratch resistant state.*

Claims 10–12, and 14–17, dependent on amended claims, are determined to be patentable.

New claims 19–22 are added and determined to be patentable.

*19. A process for forming a clear distortion-free scratch resistant coating of an organosilicon thermoset cross-linkable polymer on an optical article including the steps of applying a coating of a solution of said polymer from a supply of a solution of said polymer to said article in a controlled atmosphere maintained at a first temperature sufficiently above room temperature to precure a coating of said polymer to a tack free condition within a predetermined period of time, retaining said article in said controlled atmosphere for said predetermined time to precure said article coating to tack free condition, baking said article carrying said precured tack free coating at an elevated temperature with reference to said first temperature for a length of time sufficient to cure said coating fully to said clear distortion-free scratch resistant condition, and cooling said supply of said solution of polymer to a temperature sufficiently below room temperature appreciably to extend the useful life of said solution, said cooling step including controlling the temperature of said supply of said solution to minify the possibility of the application of uneven coatings of said solution to said articles.*

*20. A process for forming a clear distortion-free scratch resistant coating of an organosilicon thermoset cross-linkable polymer on an optical article including the steps of applying a coating of a solution of said polymer from a supply of a solution of said polymer to said article in a controlled atmosphere maintained at a first temperature sufficiently above room temperature to precure a coating of said polymer to a tack free condition, retaining said article in said controlled atmosphere for about twenty minutes to precure said article coating to tack free condition, baking said article carrying said precured tack free coating at an elevated temperature with reference to said first temperature for a length of time sufficient to cure said coating fully to said clear distortion-free scratch resistant condition, and cooling said supply of said solution of polymer to a temperature sufficiently below room temperature appreciably to extend the useful life of said solution, said cooling step including controlling the temperature of said supply of said solution to minify the possibility of the application of uneven coatings of said solution to said articles.*

*21. A process for forming a clear distortion-free scratch resistant coating of an organosilicon thermoset cross-linkable polymer on an optical article including the steps of applying a coating of a solution of said polymer from a supply of a solution of said polymer to said article in a controlled atmosphere maintained at a temperature of about 90° F. to precure a coating of said polymer to a tack free condition, retaining said article in said controlled atmosphere for about twenty minutes to precure said article coating to tack free condition, baking said article carrying said precured tack free coating at an elevated temperature with reference to said first temperature for a length of time sufficient to cure said coating fully to said clear distortion-free scratch resistant condition, and [means for] cooling said supply of said solution of polymer to a temperature sufficiently below room temperature appreciably to extend the useful life of said solution, said cooling step including controlling the temperature of said supply of said solution to minify the possibility of the application of uneven coatings of said solution to said articles.*

*22. A process for forming a clear distortion-free scratch resistant coating of an organosilicon thermoset cross-linkable polymer on an optical article including the steps of applying a coating of a solution of said polymer from a supply of a solution of said polymer to said article in a controlled atmosphere maintained at a temperature of about 90° F. to precure a coating of said polymer to a tack free condition, retaining said article in said controlled atmosphere for about twenty minutes to precure said article coating to tack free condition, baking said article carrying said precured tack free coating at a temperature above 250° F. for a number of hours sufficient to cure said coating fully to said clear distortion-free scratch resistant condition, and means for cooling said supply of said solution of polymer to a temperature sufficiently below room temperature appreciably to extend the useful life of said solution, said cooling step including controlling the temperature of said supply of said solution to minify the possibility of the application of uneven coatings of said solution to said articles.—*

* * * * *